Jan. 29, 1963 W. MOBIUS 3,075,418
APPARATUS FOR CONTROLLING A MACHINE TOOL OR THE LIKE
Filed Dec. 2, 1958 9 Sheets-Sheet 3

*Inventor:*
WALTER MÖBIUS by

*Attorney*

Inventor:
WALTER MÖBIUS by

Attorney

Jan. 29, 1963  W. MOBIUS  3,075,418
APPARATUS FOR CONTROLLING A MACHINE TOOL OR THE LIKE
Filed Dec. 2, 1958  9 Sheets-Sheet 5

Inventor:
WALTER MÖBIUS
by
Attorney

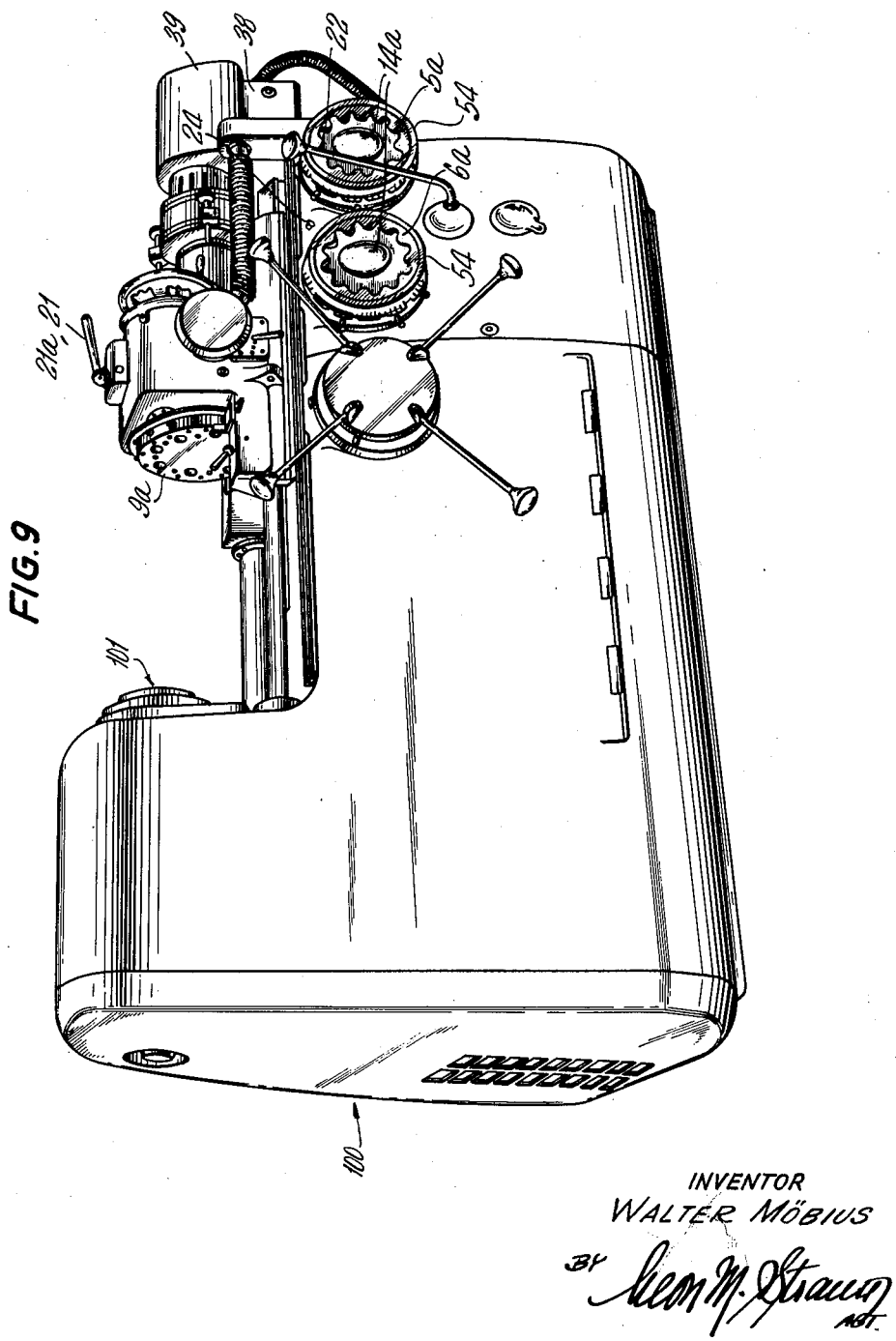

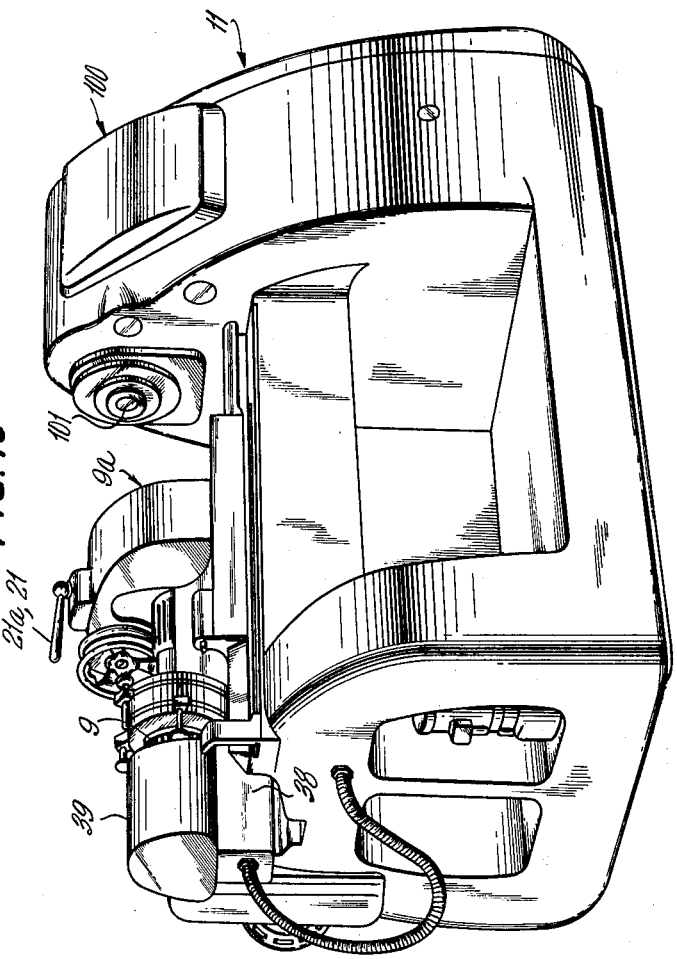

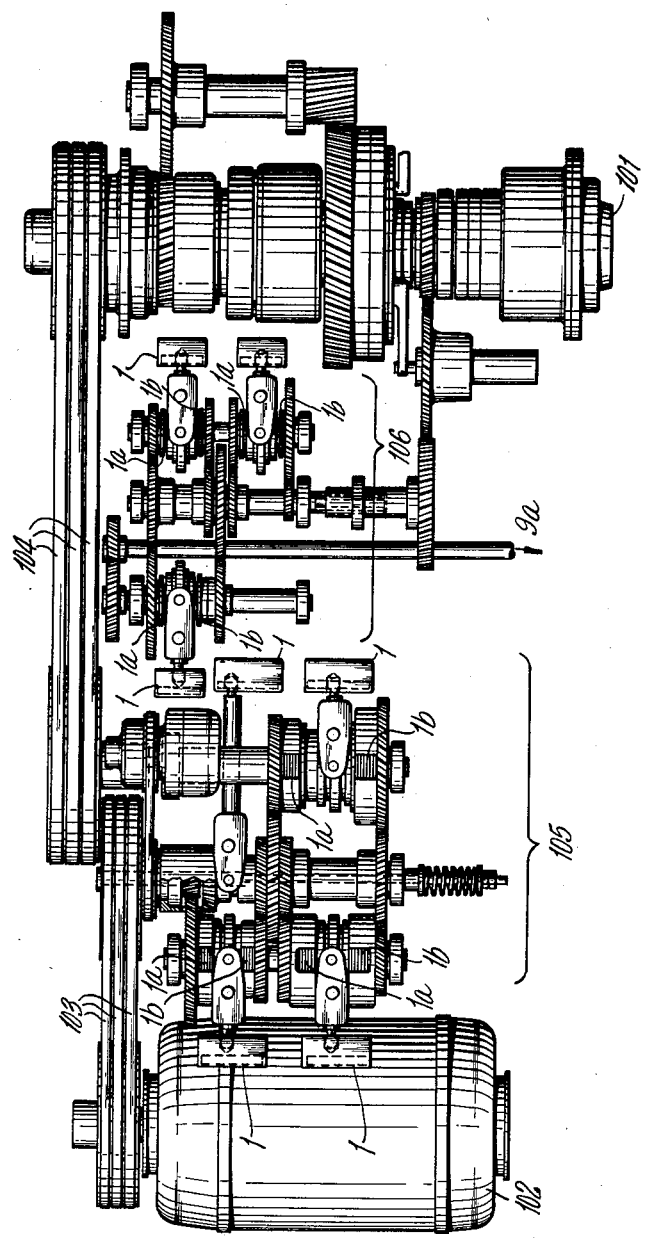

Jan. 29, 1963   W. MOBIUS   3,075,418
APPARATUS FOR CONTROLLING A MACHINE TOOL OR THE LIKE
Filed Dec. 2, 1958   9 Sheets-Sheet 9
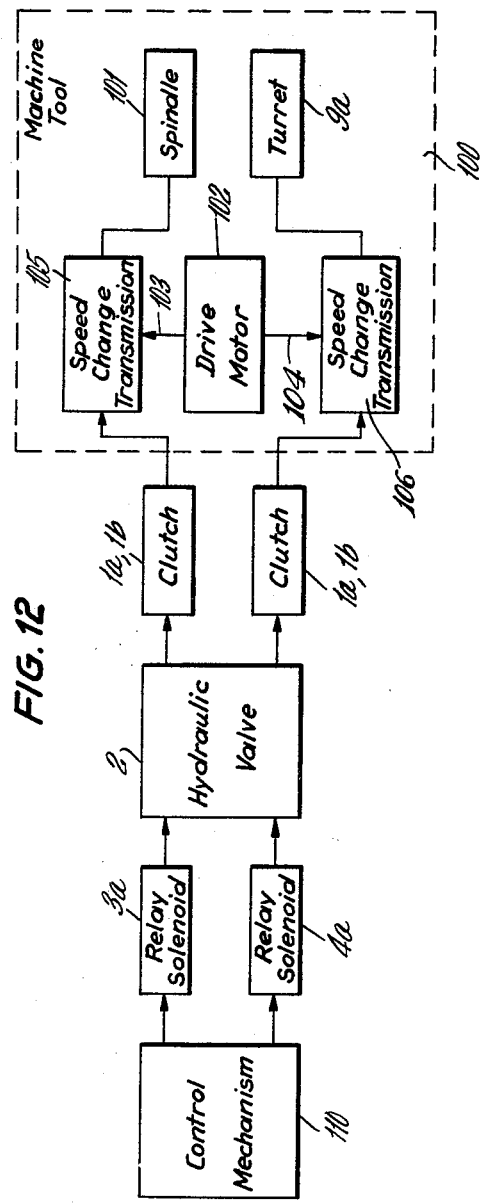
INVENTOR
WALTER MÖBIUS

United States Patent Office 3,075,418
Patented Jan. 29, 1963

3,075,418
APPARATUS FOR CONTROLLING A MACHINE TOOL OR THE LIKE
Walter Mobius, Aachen, Germany, assignor to Werkzeugmaschinenfabrik Gildemeister & Co. A.G., Bielefeld, Germany
Filed Dec. 2, 1958, Ser. No. 781,182
9 Claims. (Cl. 82—2)

The invention relates in general to apparatus for controlling a machine tool or the like. More particularly, the invention relates to control means for use with hydraulic devices for the operation of the feeds and spindle speeds of machine tools, and operable by remote control.

Desirable features for hydraulically operated feeding and spindle speed controlling mechanisms for machine tools, such as lathes, turret lathes, and automatic screw machines, include quick engagement and reliability of operation of the selected feed and spindle speed, and these features are generally found in machine tools now in use.

However, known speed change transmissions for machine tools have the disadvantage that they are operable only from a position adjacent the transmission gears, which position is not always readily accessible to the operator. If it is desired to operate the speed change transmissions from a more remote position, it has heretofore been necessary to equip the mechanism with a linkage network, which is usually found to be cumbersome and inconvenient to operate.

Furthermore, electrical devices have been employed to directly engage the feed and spindle change speed gears but the switches and the electromagnets of these devices must have relatively large dimensions to transmit the necessary power for the gear entraining movement. Therefore, the use of these electrical switch devices on machine tools was confined only to a small number of speeds and feeds, or it was necessary to build separate switch systems at the side of the machine tool.

It is therefore among the objects of the invention to provide a change speed control that may be operated conveniently and accurately from a remote location.

It is another object of the invention to provide such a control that may be operated either by hand or automatically by an element of the machine tool, with means to select either method of control, as desired.

A further object of the invention is the provision of means for preventing hand operation of the mechanism when set for automatic operation, permitting only one type of operation at one time.

A further object of the present invention is to provide means enabling the control of feed and spindle speeds which allow for a generally simplified construction and operation of machine tools, such as lathes and turret lathes.

A further object of the invention is the provision of means affording the use of relatively small electrical power to operate the hydraulic valves associated with the speed change transmission of the machine tool.

A still further object of the invention is the provision of an electrical control system for the speed change transmission of a machine tool or the like, which permits the use of a reduced number of switches, which can be of relatively small size.

These and other objects of the invention will become further apparent from the following detailed description, reference being made to the accompanying drawings, showing a preferred embodiment of the invention.

In the drawings, which illustrate the best modes presently contemplated for carrying out the invention:

FIG. 9 is a front perspective view of a turret lathe embodying the present invention;

FIG. 10 is a rear perspective view of the turret lathe illustrated in FIG. 9;

FIG. 11 is an end view taken in the direction of the arrow 11 in FIG. 10, with an end cover plate removed; and FIG. 12 is a block diagram of an electrical control system pursuant to the present invention.

Figure 1:
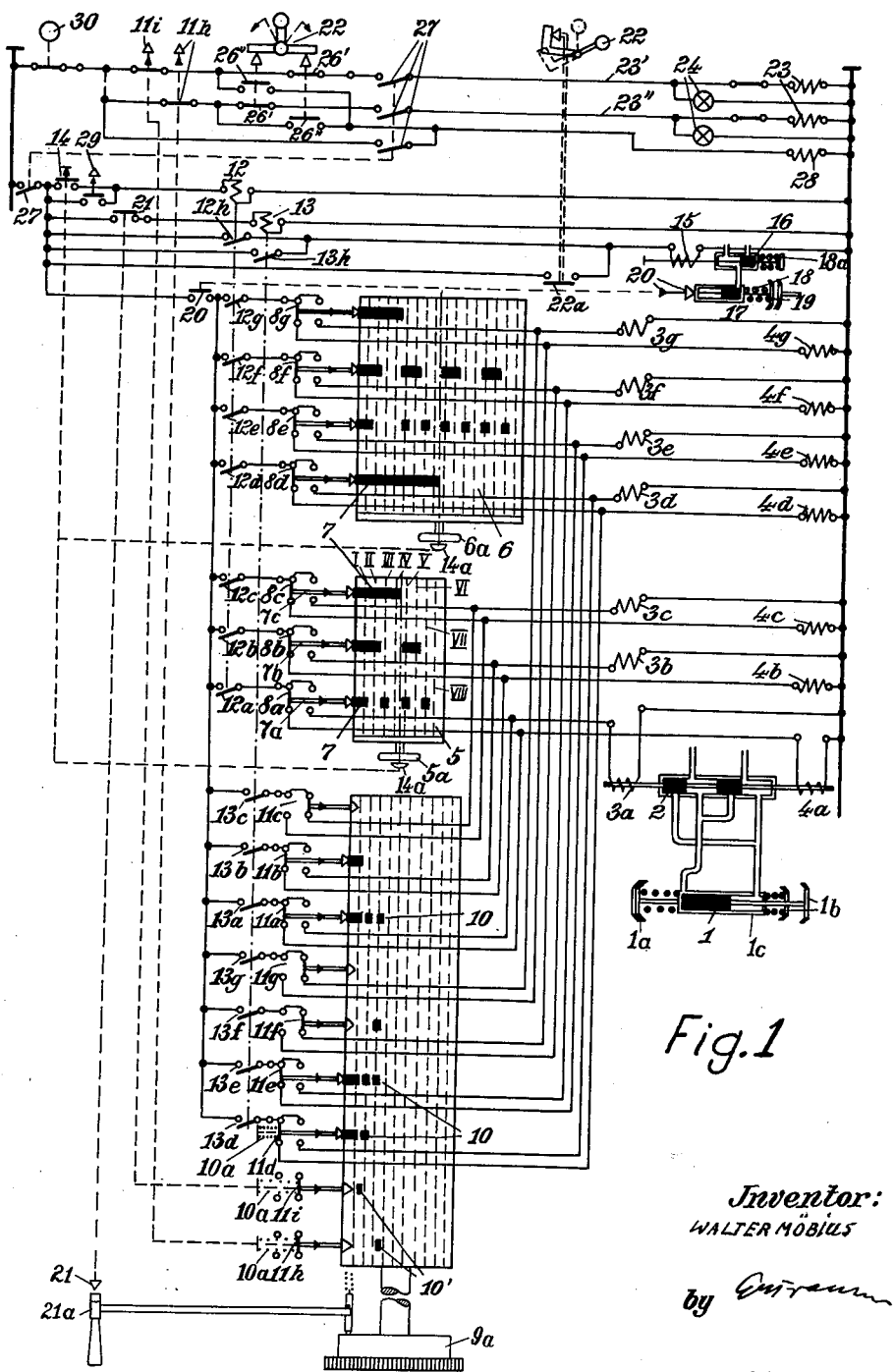
FIG. 1 is a schematic diagram of the electrical control mechanism.

It is known in the prior art to provide machine tools with change speed gears for various drives, which are entrained by hydraulically operated pistons controlled by electro-magnetically operated valves. However, pursuant to the present invention, there is provided a pair of switches in parallel with each other and in series with each electro-magnet.

A first group of switches, comprising one switch of each pair, is controlled by one or more manually rotatable dog or cam drums, and a second group of switches, comprising the other switch of each pair, is mechanically controlled in response to the movement of a tool or work support, which, for example, may be the turret of a turret lathe.

Means are provided to provide a current pulse, selectively at either one of the two groups of switches, which pulse momentarily energizes a selected electro-magnet, the particular electro-magnet being selected in accordance with the combination of the switch positions within the group to which the pulse is applied. A preferred embodiment of the invention, for use with a turret lathe, has two double-throw switches connected in parallel to each valve control, and both switches are disposed to be actuated by rotatable stops, one of which is manually operable and the other of which is rotated in response to movement of the turret.

Referring now to the drawings in detail, and particularly to FIGS. 9 through 12, there is shown a machine tool constituted by the turret lathe 100 having a spindle 101 and a turret 9a. In the present embodiment, the spindle can operate at sixteen different speeds and the turret has eight different feeding speeds. The turret lathe, per se, is of conventional construction. Provision is made for a main drive motor 102 (FIG. 11) which, through V-belts 103 and 104 operates, respectively, a conventional geared speed change transmission 105 for the spindle drive mechanism and a geared speed change transmission 106 for the turret feed mechanism.

Conventional clutches for each spindle speed and for each turret feed speed are each actuated by the piston of hydraulic cylinders of conventional construction. For example, there is schematically illustrated in FIG. 1 a well-known hydraulic assembly or cylinder 1c, having a reciprocable piston 1 operating two clutches 1a and 1b, and a control valve 2 for the cylinder, which operates the piston 1 selectively in opposite directions for clutch engagement and release, respectively.

As best shown in FIG. 12, the conventional clutches associated with the spindle, when actuated, operate in conventional manner to couple or entrain a predetermined one of the speed change gear trains or transmissions between the drive motor and the spindle so that the spindle rotates at the preselected speed determined by the predetermined one of the speed change transmissions or gears for spindle speed.

In the same manner, the conventional clutches associated with the turret, when actuated, operate in conventional manner to couple or entrain a predetermined one of the speed change gear trains or transmissions between the drive motor and the conventional turret feed mechanism so that the turret feeds at the preselected feed rate determined by the predetermined one of the speed change transmissions or gears for turret feed rate.

Each of the valves 2 is operable by means of two oppositely directed solenoids, generally designated 3 and 4, respectively. The solenoids 3a, 3b and 3c, and likewise the solenoids 4a, 4b and 4c actuate associated valves 2 of the turret feed drive, and the solenoids 3d, 3e, 3f, and 3g, and correspondingly the solenoids 4d, 4e, 4f and 4g actuate the associated valves 2 of the spindle speed drive.

The arrangement of the cylinder 1c with the piston 1 and the valve 2 is similar for all of the solenoids, and only one hydraulic assembly is illustrated in FIG. 1. For the assumed number of sixteen spindle speeds and eight turret feed speeds, seven hydraulic assemblies must be provided in the turret lathe. The associated groups of solenoids are illustrated because these are important for the description of the invention.

Actuation of all of the solenoids 3 and 4 can be effected either by hand or by automatic control by a rotary part of the machine, for instance by the turret head, both types of control utilizing the control mechanism generally indicated by reference numeral 110 in FIGS. 1 and 12. A main switch 27 is provided that connects to, and disconnects from, an electric source, such as a network, the electric circuit of the machine as well as the circuit 28 of the pump for cooling liquid.

*Manual Control.* As shown in the drawings, there are provided two manually rotatable drums 5 and 6. They are preferably arranged near the normal position of the operator of the turret lathe so that he has ready access to them.

Drum 5 may have a hand wheel 5a and drum 6 may have a hand wheel 6a. Cams 7 are provided on the selector drums 5 and 6. Alternatively, the drums may comprise exchangeable cam discs.

Double-throw switches are provided, one for each pair of solenoids 3 and 4, and designated, in correspondence to the solenoids, 8a, 8b, 8c, 8d, 8e, 8f and 8g. Each of the switches 8a–8g includes a cam follower 7a for the cam 7 adjacent thereto, and each cam 7 will actuate a cam follower to operate the associated double-throw switch. The drum 5 is operable to select the predetermined turret feed speed, while the drum 6 is operable to select the predetermined spindle speed. The operation of said control device is described hereinafter for the drum 5 for the predetermination of the feeds.

The eight turret feeding speeds are provided with the aid of only three hydraulic assemblies and therefore three double-throw switches are provided for selecting the eight speeds. Therefore, the drum 5 has eight positions which are indicated in FIG. 1 by the dotted lines drawn through the drum 5, and which are denoted by the reference numerals I to VIII.

Seven cams of different length are provided on the drum 5. The cam follower 7a is actuated by four cams in the positions I, III, V, VII; the cam follower 7b is actuated by two cams whose length is such that they extend across the positions I to II and V to VI, respectively; the cam follower 7c is actuated by one cam extending across the positions I to IV. These seven cams actuate the three cam followers to bring the switches 8a–8c into their left hand positions, selecting the solenoids 4a–4c, as shown in FIG. 1.

If a cam releases its cam follower, the bias of a spring (not shown) throws the switch into the right hand position, selecting the solenoids 4a–4c. The position VIII is established without using cams, so that all three switches are then in their right position for energizing all solenoids 4a–4c. Therefore, eight combinations for the positions of the three valves can be produced by seven cams.

In machine tools that are only provided with manual selectors and not with automatic selectors, the main switch may, for instance, be provided directly on one or both of the hand wheels 5a or 6a and may consist of a push button 14a.

Where machine tools are provided with both a manual selector as well as an automatic selector, means must be provided to prevent simultaneous operation of both, while at the same time enabling the shifting from manual to automatic operation, and vice versa. For this purpose, the switches 8a–8g of the manual selector have assigned thereto connecting series switches 12a–12g, so that the switch 8a has assigned to it a connecting switch 12a, the switch 8b a connecting switch 12b . . . and the switch 8g a connecting switch 12g. The connecting switches 12a–12g are operated simultaneously by a relay 12. Conversely, a relay 13 controls connecting switches 13a–13g of the switches 11a–11g of the automatic selector.

The manual operation to establish one of the spindle speeds or one of the feed speeds is performed in the following manner: After closing the main switch 27, the operator turns the hand wheel 5a or 6a of the drums 5 or 6, respectively, to give the cams 7 and the cam followers 7a, appointed for the selected speed, the right position for forming predetermined groups of the switches 8a–8g. Then the operator presses the button 14a for the contact 14 thereby energizing the relay 12 to close all connecting switches 12a–12g, as well as switch 12h. The switch 12h is connected to a solenoid 15 that is operable to actuate the valve 16 of a hydraulic piston 17 against the bias of a spring 18a.

The piston 17 is then actuated by the pressure fluid against the bias of a spring 18 and disengages the main clutch 19 of the turret lathe, and at the same time may actuate a brake (not shown). The movement of the piston 17, furthermore, closes a switch 20, whereby the circuits of all of the connecting switches 12a–12g will be completed over the switches 8a–8g, according to their selected positions.

In this selected position of the cams 7 and the cam followers 7a, the switches 8 cause the energization of the solenoids 3 and 4 to bring the valves 2 into the predetermined positions to entrain the gears for the selected spindle speed or the feed speed.

After completion of the change over operation, the operator will manually release the push button 14a. Thereupon, the relay 12 will release the switches 12a–12h, which will thereby be opened. As a result thereof, the solenoid 15 will be de-energized, and the piston 17 be moved in the opposite direction under the impulse of the spring 18; this movement of the piston 17 will cause engagement of the main clutch 19, and at the same time, the release of the brake, and also cause opening of the switch 20.

*Automatic Control.* On the axis of the turret 9a there is mounted a selector such as a drum 9, having cams 10. The cams 10 actuate cam followers 10a that carry the double-throw switches 11a–11g which correspond to the switches 8a–8g of the manual control. The switches 11a–11g are connected to the solenoids 3 and 4 in parallel with the switches 8a–8g.

The operator will first close the main switch 27.

The operation of the automatic actuator is as follows: The locking lever 21a for the turret 9a is in driving connection with a momentary action switch 21, in such a manner that it can be actuated only after the engagement of the lock mechanism for the turret, so that it will be closed by the indexing of the turret, but only for a moment, to provide a current pulse to effect changes in the positions of the valves 2.

Upon closing of the switch 21 a relay 13 is energized to close connecting switches 13a–13g that are assigned to the switches 11a–11g.

At the same time, the relay 13 will close the switch 13h, thereby energizing the solenoid 15 for operation of the valve 16, the piston 17, the main clutch 19 of the turret lathe, the brake, and the switch 20, as described in the foregoing. De-energization will be brought about by opening of the switch 21.

In order to control the direction of rotation of the motor during operation of the automatic control mechanism, there are provided two terminal switches 11h and 11i, and also two additional cams 10' on the drum 9. The terminal switches 11h and 11i are connected to the leads 23' and 23" of the circuits for the reversing relays 23 of the driving motor 102.

Depending on which of the cams 10' operates a terminal switch, either the lead 23' or the lead 23" will conduct current to one of the relays 23, causing rotation of the motor in one or in the opposite direction, respectively. Signal lamps 24 are provided in series with the leads 23' and 23", to indicate to the operator the direction of the rotation of the motor.

There is also provided a manual multi-position pilot switch 22 that is movable in two planes. The switch 22 operates a contact 22a that is in circuit with the solenoid 15, so that operation of the switch 22 in one plane will cause the actuation of the clutch 19 and of the brake. Operation of the switch 22 in the other plane, on the other hand, controls the motor by way of the leads 23' and 23", by means of contacts 26' and 26" that are disposed in series with said leads, to control the rotational direction of said motor.

There is also provided a switch 29 in parallel with the push button 14a, that is operated for certain purposes, for instance, for cutting screw threads.

There is also provided a thermo control relay 30, for disconnecting the machine from the source when the current exceeds a predetermined value, in order to protect the motor.

Figure 2:
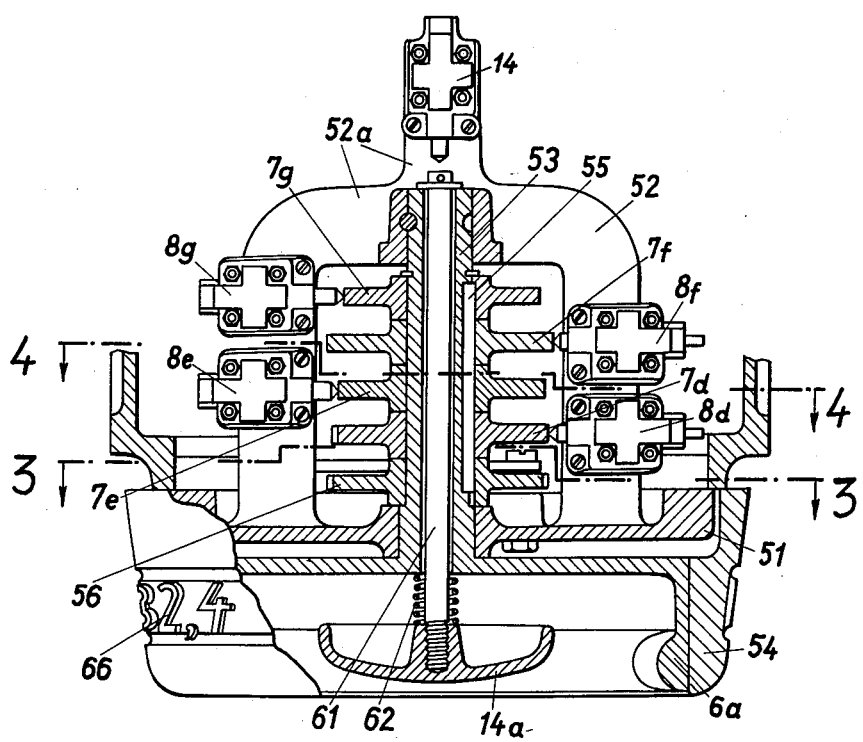
FIG. 2 is a longitudinal sectional view of a manually rotatable cam drum.
Figure 3:
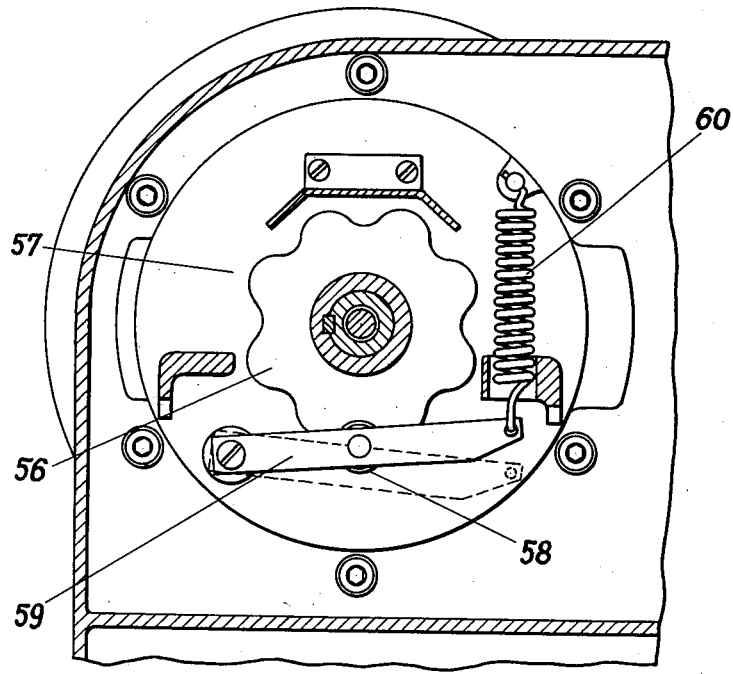
FIG. 3 is a sectional view along line 3—3 of FIG. 2.
Figure 4:
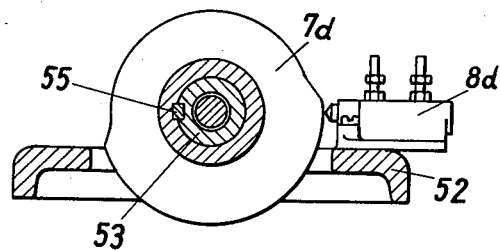
FIG. 4 is a sectional view along line 4—4 of FIG. 3.
Figure 5:
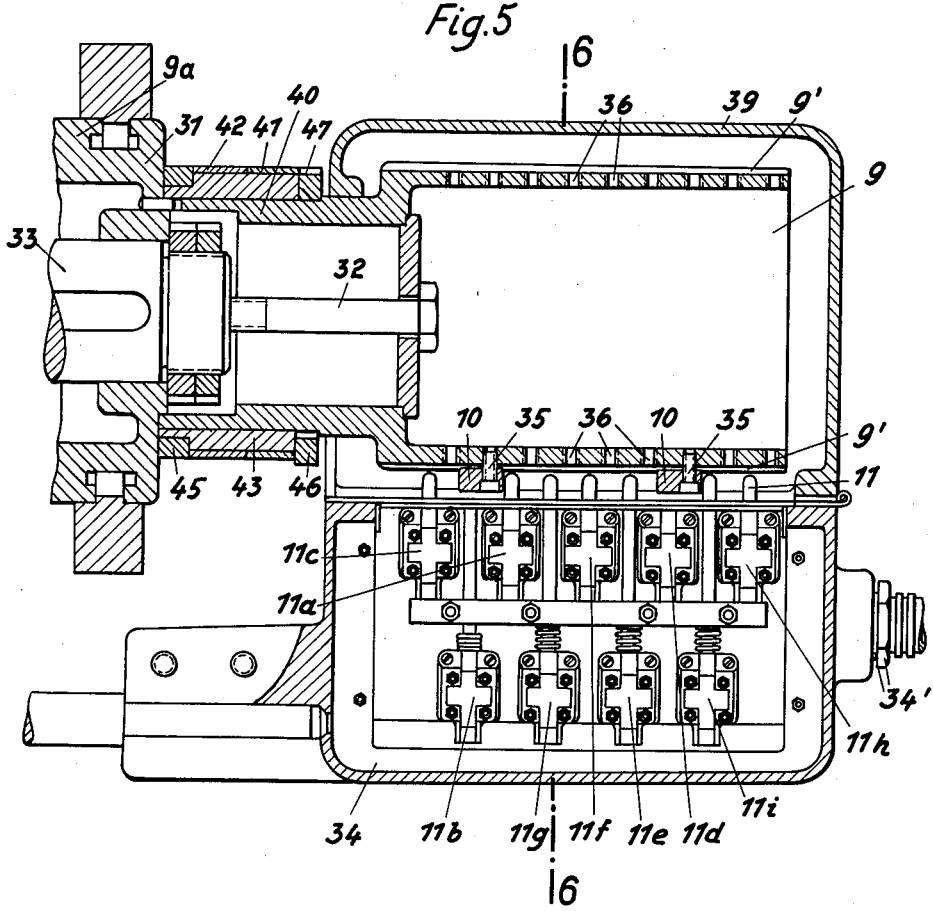
FIG. 5 is a longitudinal sectional view of a modified control mechanism.
Figure 7:
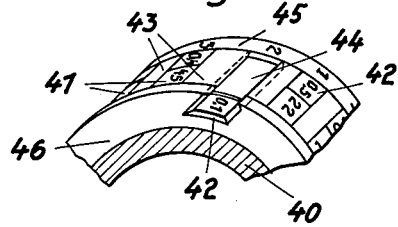
FIG. 7 is a perspective view of a ring with the figures denoting the feed and speed.

*The Control Devices.* The device for manual control is illustrated in FIGS. 2 to 4. It consists of a frontal flange 51 screwed to the front side of the machine tool. The frontal flange 51 is provided on its back with a U-shaped yoke 52 to carry the two-way switches, for example the switches 8d, 8e, 8f and 8g for energizing the solenoids of the different gears of the spindle speed drive, as described above. A hollow spindle 53 carrying the hand wheel 6a is rotatable in bearings which are coaxial with the flange 51 and the yoke 52. The projecting rim 54 of the hand wheel encloses the flange 51 in order not to detract from the appearance of the lathe. Four cam plates 7d, 7e, 7f and 7g are interchangeably connected by a key or wedge 55 with the hollow spindle 53.

The double-throw precision switches 8d–8g of small dimensions are fixed on the yoke opposite to the cam plates 7d–7g. The hollow spindle 53 also mounts a disc 56 with notches 57 which are engaged by a roll 58 on the lever 59 biased by a tension spring 60.

The disc may have, in the illustrated exemplification, eight notches for eight different positions for the combined switches to produce eight different speeds.

The push button 14a is screwed to a rod 61 sliding in the hollow spindle 53 to push the switch 14 which is fixed on a projection 52a of the yoke 52. The push button 14a is located within the inner space of the hand wheel 6a and is there biased by a pressure spring 62. By the operator turning the hand wheel and thereafter by pressing the button with his same hand, the pre- selected speed is established by the hydraulic device. If the operator removes his hand from the hand wheel, then the button 14a returns, and the switch 14 is released. Numerals 66 applied to the surface of the rim of the hand wheel show the positions for the different speeds. The rim 54 is exchangeably connected with the hand wheel 6a to use the same kind of control device for different types of machine tools.

FIGS. 5 to 8 illustrate a switch device connected and actuated by the turret head of a turret lathe.

Figure 6:
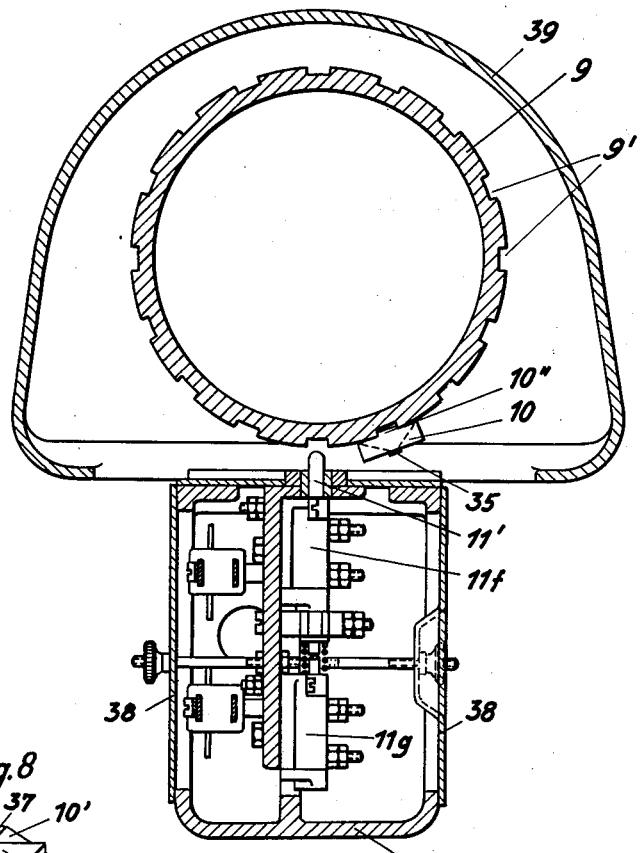
FIG. 6 is a sectional view along line 6—6 of FIG. 5.
Figure 8:
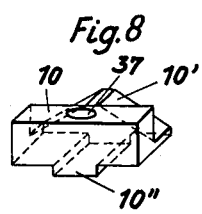
FIG. 8 is a perspective view of a cam for governing the switch.

A drum 9 with axial longitudinal grooves 9', equally distributed around its periphery, is centrally connected with the rear end of the turret head 9a by a threaded bolt 32. The drum 9 may have sixteen grooves 9', as illustrated in FIG. 6, corresponding to the sixteen positions of the turret head.

Nine double-throw switches of small dimensions are located in a casing 34 fixed to the carriage of the turret head. The nine switches 11a–11i are arranged in two rows so that all cam followers 11' are located in one plane parallel to the axis 33 of the turret head 9a. The switches 11b, 11e, 11g and 11i in the lower row are provided, therefore, with longer cam followers which are bent upwardly and pass between the upper row of the switches.

Cams 10 are provided with bores 37 (FIG. 8) for inserting screws 35 to connect them in the slots 9'. These cams have on one side two gradient surfaces 10' for engagement by the cam followers 11'; and they have on the under side projections 10" serving as a guide in the grooves 9'. The drum 9 is covered by a hood 39 supported with a hinge on the casing 34, which is covered on two sides by removable plates 38 for the inspection of the switches. The casing 34 is connected to the carriage of the turret head and carries on its rear a sleeve 34' for the introduction of the electric wires.

A cylinder 43, located on the collar 40 of the drum 9, is provided on its surface with dovetailed slots 44 (FIG. 7) whose number corresponds with the number of the positions into which the turret head can be brought. An end ring 45 is fixed on the cylinder 43 and has in the areas of the slots 44 indications corresponding to the number of the positions of the turret head.

The plates 41 and 42, furnished with figures denoting the feed and the speed, will be inserted into the slots 44, to denote the velocity of the feed and the revolutions per minute of the operating spindle 101 which corresponds to the respective position of the turret head. An end ring 46 is turnable on the side of the cylinder opposite to the ring 45. This ring has only one dovetailed recess 47 through which the plates 41 and 42 can be inserted into the slots 44. These plates are secured by turning the ring 46 on the collar 40 so that the plates are fixed into their slots.

The present application is a continuation-in-part of my prior application, now abandoned, Serial Number 229,321 filed June 1, 1951.

It will be apparent to those skilled in the art that the novel principles of the invention disclosed herein in connection with specific exemplification thereof will suggest various other modifications and applications of the same. It is accordingly desired that in construing the breadth of the appended claims they shall not be limited to the specific exemplification of the invention described herein.

Having thus described the invention, what I claim as new and desire to be secured by Letters Patent, is as follows:

1. A machine tool having a first speed change transmission means including gear trains operatively connected to a multi-speed spindle assembly, a second speed change transmission means including gear trains operatively connected to a multi-feed tool carriage assembly, a work support, and a control means mechanism; said control mechanism comprising, in combination, plural hydraulic actuator means selectively operable to entrain predetermined gear trains for driving said spindle and feeding said tool at preselected operating speeds and feeding rates, respectively; plural valve means each operatively controlling a respective actuator means and each having a pair of control positions; electrical operating means for each of said valve means each operable to move its associated valve means selectively to either control position thereof; a first energizing circuit for each operating means, each including a first switch, a second energizing circuit for each operating means, each including a second switch; the first and second energizing circuits for each operating means being in parallel with each other; manually operable switch setting means operating said first switch and having plural setting positions in each of which the first switches are selectively operated to pre-set the associated operating means to operate the associated valve means to a selected control position upon closure of said first energizing circuits; manually actuated control means effective, when actuated, to connect all of said first energizing circuits momentarily across a source of potential; mechanically operable switch setting means movable in accordance with movement of said work support, operating said second switch and having plural setting positions in each of which the second switches are selectively operated to pre-set the associated operating means to operate the associated valve means to a selected control position upon closure of said second energizing circuits; and second control means automatically actuated, responsive to completion of movement of said work support to a selected position, to connect all of said second energizing circuits momentarily across said source of potential.

2. A machine tool and control mechanism therefor as claimed in claim 1 in which said first and second switches are double throw switches, and each position thereof is coordinated with a respective control position of the associated valve means.

3. A machine tool and control mechanism therefor as claimed in claim 2 in which each electrical operating means comprises a pair of opposed electromagnets each energized in a respective position of the controlling first and second switch.

4. A machine tool and control mechanism therefor as claimed in claim 1 in which said machine tool is a turret lathe having a turret constituting said work support, a turret locking bolt and a bolt operating lever; said second control means including said lever and actuated in response to indexing of said turret and re-engagement of said locking bolt.

5. A machine tool and control mechanism therefor as claimed in claim 1 in which said setting means comprise rotatable drums having selectively positioned cam means operating said switches.

6. A machine tool and control mechanism therefor as claimed in claim 4 in which said manually actuated control means includes a relay having plural normally open switch means each in series with said source and a respective first switch, and a push button controlling an energizing circuit for said relay; and said second control means includes a second relay having plural normally open switch means each in series with said source and a respective second switch, and a switch operated by said lever and controlling an energizing circuit for said relay.

7. A machine tool and control mechanism therefor as claimed in claim 5 in which said manually operable setting means includes a pair of said drums each having its selectively positioned cam means controlling a selected group of said first switches; one drum of said pair pre-setting the spindle speed and the other pre-setting the tool feeding rate.

8. A machine tool and control mechanism therefor as claimed in claim 5 in which said selectively positioned cam means comprises cam disks interchangeably mounted on a rotatable control shaft; said switches having cam followers engaging said cam disks.

9. A machine tool and control mechanism therefor as claimed in claim 1 in which said machine tool includes a motor and clutch means connecting said motor in driving relation to said transmission means; electric operating means operable when energized to disengage said clutch means; and an energizing circuit for said last named operating means closed responsive to operation of either of said control means.

References Cited in the file of this patent

UNITED STATES PATENTS

| | | |
|---|---|---|
| 831,451 | Mandelick | Sept. 18, 1906 |
| 1,269,489 | Murphy | June 11, 1918 |
| 2,244,463 | Kingsbury et al. | June 3, 1941 |
| 2,355,869 | Johnson | Aug. 15, 1944 |
| 2,384,809 | Bullard et al. | Sept. 18, 1945 |
| 2,594,782 | Makant et al. | Apr. 29, 1952 |
| 2,616,159 | Curtis | Nov. 4, 1952 |
| 2,859,290 | Grinage | Nov. 4, 1958 |